(Model.)

M. D. SAXE.
COFFEE CAN.

No. 300,137. Patented June 10, 1884.

Witnesses
A. C. Smith
John T. Booth

Inventor
M. D. Saxe
by Geo. A. Mosher
Atty.

UNITED STATES PATENT OFFICE.

MATTHEW D. SAXE, OF TROY, NEW YORK.

COFFEE-CAN.

SPECIFICATION forming part of Letters Patent No. 300,137, dated June 10, 1884.

Application filed February 1, 1884. (Model.)

*To all whom it may concern:*

Be it known that I, MATTHEW D. SAXE, a resident of the city of Troy, in the county of Rensselaer and State of New York, have invented certain new and useful Improvements in Coffee-Cans; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in coffee-cans; and it consists in the construction and arrangement of parts, as will be hereinafter described, and particularly pointed out in the claim.

The object of my invention is to provide a cheaply-constructed coffee-can, which may be easily and quickly sealed, to exclude outside air and retain the aroma of the coffee, and as easily and quickly unsealed and opened to permit of easy access to the coffee.

Figure 1:
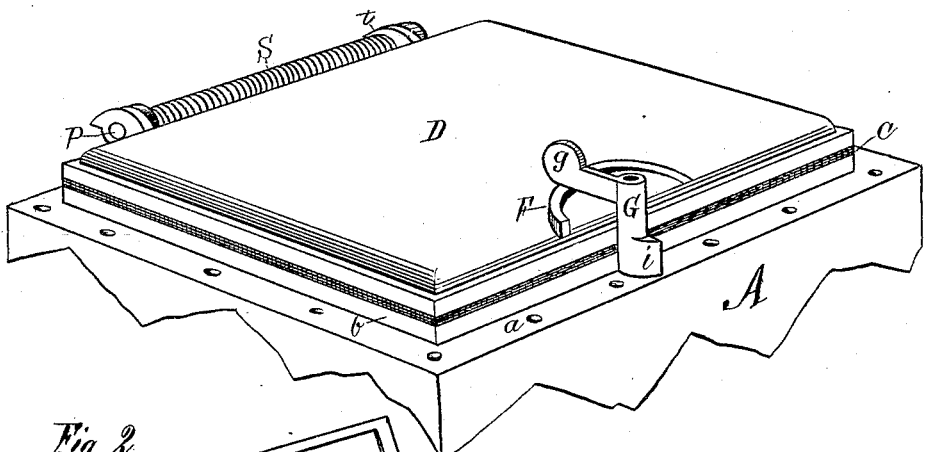
Figure 3:
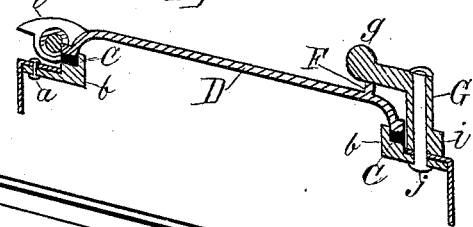
Figure 2:
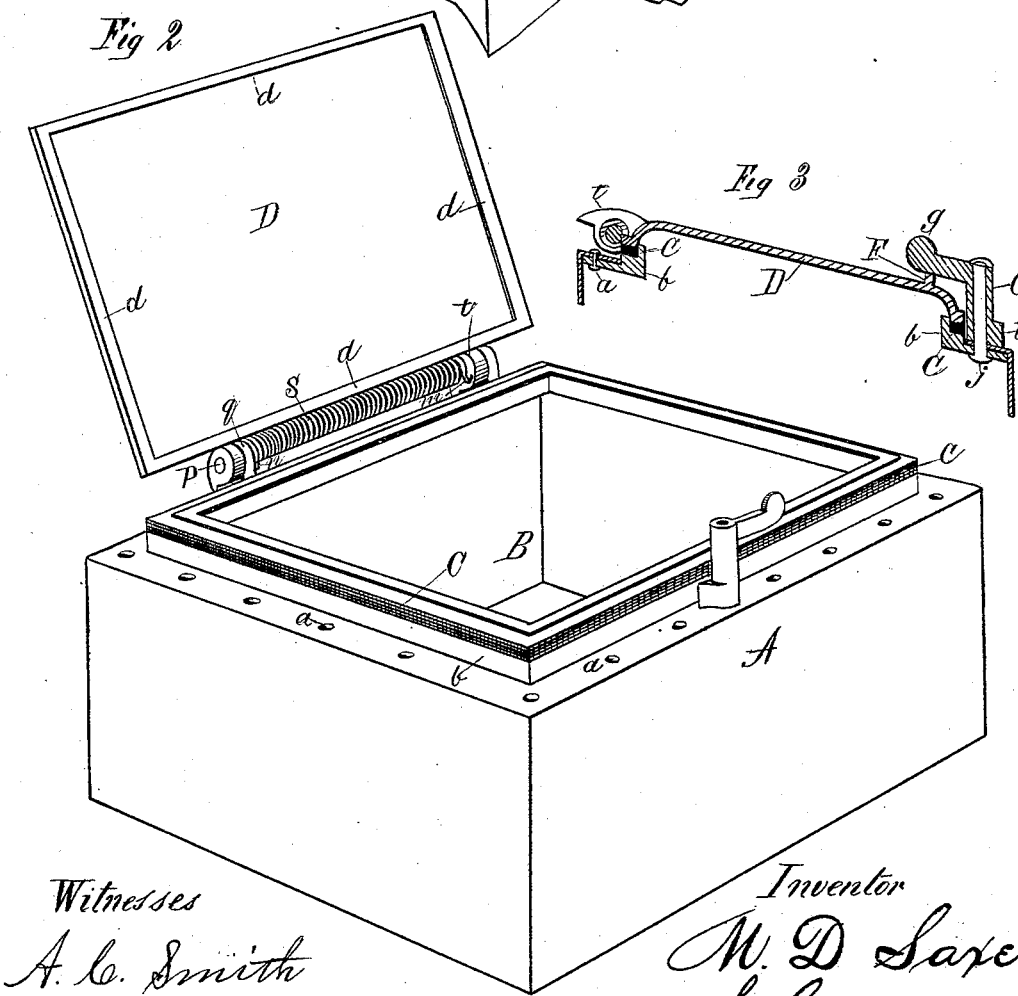

Figure 1 of the drawings is a view in perspective of the upper portion of a coffee-can with the cover closed and sealed. Fig. 2 is a perspective of can and open cover. Fig. 3 is a vertical cross-sectional view of cover and upper portion of can, taken through the middle of Fig. 1.

It is well known that after coffee-beans are roasted preparatory to use they soon lose their flavor and peculiar aroma if exposed to the air, and if the roasted beans have been ground or crushed they quickly lose their best qualities, and become almost worthless unless secured within some air-tight inclosure. If the inclosure is perfectly air-tight, even ground coffee will retain its original flavor and strength for weeks and months.

A represents a coffee-can, which may be of any convenient form, and is preferably made of sheet metal with soldered seams, and provided with a suitable opening, B, in its upper side. The opening is provided with a rim or frame, $b$, made of cast-brass, and soldered to the edges of the can-opening or riveted thereto by the rivets $a$. Upon the frame is cemented the elastic cushion C, preferably made of strips of rubber, passing entirely around the opening B. The cover D, hinged to one side of the can or frame $b$, is also made of cast-brass, and is provided with the projecting flanges, adapted, when the cover is closed, to fit and rest upon the elastic cushions C. The cover is so hinged that when it is tightly closed its flanges $d$ will press firmly upon the elastic cushions upon every side throughout their entire length. The lock G, pivoted to frame $b$ by pivot $j$, is provided with arm $g$ and stop $i$. The cover is also provided with the circular flange F, projecting farther from the cover at one of its ends than at the other, so that its upper surface forms an inclined plane, and when the cover is closed the arm $g$ is swung around upon flange F to about the position shown in Fig. 1. The farther the arm travels upon the inclined plane of flange F the more tightly is the cover pressed down upon the elastic cushions and locked. The stop $i$ serves to prevent the arm $g$ from being swung too far away from the cover when unlocked, and to afford an extended bearing to resist the pressure of the cover upon the arm $g$ when locked, as shown in Fig. 1. The pivotal rod P, by which the cover is hinged to the can, supports a surrounding coil-spring, one end of which, $n$, may be attached to the can or lip $q$, projecting therefrom, and the other end, $m$, to the cover or lip $t$, projecting therefrom, so that the spring acts to raise the cover from the closed position shown in Fig. 1 to the open position shown in Fig. 2, whenever the cover is unlocked by swinging arm $g$ off from the cover to the position shown in Fig. 2; from which it appears that to open the can it is only necessary to swing the arm $g$ off from the cover, when the latter is opened by the spring without other assistance. I am thus able to easily and quickly open and close the cover with one hand, and every time the cover is closed the can is sealed air-tight.

My improved cans are especially adapted for use in retail stores, where frequent and convenient access must be had to their contents.

I wish it to be understood that I do not confine myself to the material used in the construction of my coffee-can, as is described in the foregoing specification. I may use any suitable material.

What I claim as new, and desire to secure by Letters Patent, is—

The coffee-can herein described, consisting of the body A, having the rim $b$ and cushion C, the hinged cover having the arm F, and the pivoted lock G, provided with an arm, $g$, and stop $i$ to engage the arm F, to secure the cover and body together, as shown and described.

In testimony whereof I have hereunto set my hand this 30th day of January, 1884.

MATTHEW D. SAXE.

Witnesses:
 GEO. A. MOSHER,
 A. C. SMITH.